United States Patent
Shealy et al.

(10) Patent No.: US 11,719,191 B2
(45) Date of Patent: Aug. 8, 2023

(54) SKIRTED LEAF SEAL APPARATUS

(71) Applicant: General Electric Company, Schenectady, NY (US)

(72) Inventors: James Shealy, Cincinnati, OH (US); Donald M. Corsmeier, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/352,605

(22) Filed: Jun. 21, 2021

(65) Prior Publication Data

US 2022/0403798 A1 Dec. 22, 2022

(51) Int. Cl.
*F02K 1/80* (2006.01)
*F02K 1/12* (2006.01)

(52) U.S. Cl.
CPC ............ *F02K 1/805* (2013.01); *F02K 1/1207* (2013.01); *F05D 2240/57* (2013.01)

(58) Field of Classification Search
CPC ... F02K 1/00; F02K 1/805; F02K 1/78; F02K 1/80; F02K 1/12; F02K 1/1207; F02K 1/1215; F02K 1/1223; F02K 1/123; F02K 1/1238; F02K 1/1246; F02K 1/1253; F02K 1/1261; F02K 1/1269; F02K 1/1276; F02K 1/1284; F02K 1/1292; F02K 9/00; F02K 9/97; F02K 9/32; F02K 9/34; F02K 9/343; F02K 9/346; F05D 2240/00; F05D 2240/11; F05D 2240/55; F05D 2240/57
USPC ....................................................... 277/591
See application file for complete search history.

(56) References Cited

U.S. PATENT DOCUMENTS

| | | |
|---|---|---|
| 3,121,995 A | 2/1964 | Albani |
| 3,167,206 A | 1/1965 | Nelson |
| 3,422,981 A | 1/1969 | Obrien |
| 4,575,006 A | 3/1986 | Madden |

(Continued)

FOREIGN PATENT DOCUMENTS

| | | |
|---|---|---|
| DE | 3026245 | 11/1997 |
| EP | 1491931 | 12/2004 |

(Continued)

OTHER PUBLICATIONS

USPTO; U.S. Appl. No. 17/407,439, Application filed Aug. 20, 2021, entitled "Plunger Seal Assembly and Sealing Method,".

(Continued)

*Primary Examiner* — Nathan Cumar
(74) *Attorney, Agent, or Firm* — Fitch, Even, Tabin & Flannery, LLP

(57) ABSTRACT

In some embodiments, apparatuses are provided herein useful to sealing a gap between a movable flap and a stationary structure, such as a gap between a gas turbine engine nozzle flap and a corresponding sidewall. An apparatus for sealing such a gap may be a dynamic skirted leaf seal which may include a flap arm and a wall arm opposite the flap arm. A distal end portion of the flap arm may comprise a first skirt and the distal end portion of the wall arm may comprise a second skirt that engages the first skirt. When positioned in a gap between the movable flap and the stationary structure, the skirted leaf seal may exert a force to urge the flap arm towards the flap and to urge the wall arm towards the structure to seal the gap.

20 Claims, 11 Drawing Sheets

(56) References Cited

U.S. PATENT DOCUMENTS

| | | | |
|---|---|---|---|
| 4,575,099 A | 3/1986 | Nash | |
| 4,739,932 A | 4/1988 | Szuminski | |
| 4,815,276 A | 3/1989 | Hansel | |
| 4,917,302 A | 4/1990 | Steinetz | |
| 5,115,979 A | 5/1992 | Ellerhorst | |
| 5,143,292 A | 9/1992 | Corsmeier | |
| 5,288,020 A | 2/1994 | Pirker | |
| 5,323,965 A | 6/1994 | Froemming | |
| 5,417,441 A * | 5/1995 | Hill | F02K 1/805 239/265.11 |
| 5,522,546 A | 6/1996 | Jarvis | |
| 5,676,312 A | 10/1997 | Lapergue | |
| 6,702,300 B1 | 3/2004 | Steinetz | |
| 7,775,048 B2 | 8/2010 | Grammel, Jr. | |
| 9,016,695 B2 * | 4/2015 | Treat | F16J 15/061 277/637 |
| 9,103,298 B2 | 8/2015 | Gormley | |
| 9,341,120 B2 | 5/2016 | Barry, Jr. | |
| 9,810,085 B2 * | 11/2017 | McMahon | F02K 1/12 |
| 10,513,939 B2 | 12/2019 | Roberge | |
| 10,550,707 B2 | 2/2020 | Boeck | |
| 10,969,015 B2 | 4/2021 | George | |
| 11,047,481 B2 | 6/2021 | Bidkar | |
| 2008/0000236 A1 | 1/2008 | Grammel | |
| 2013/0033005 A1 | 2/2013 | Treat | |
| 2016/0076391 A1 | 3/2016 | Guinn | |
| 2017/0146130 A1 | 5/2017 | Yanagisawa | |
| 2018/0149032 A1 * | 5/2018 | Boeck | F01D 11/005 |
| 2018/0202659 A1 | 7/2018 | Stieg | |
| 2018/0328313 A1 | 11/2018 | Senofonte | |
| 2018/0335143 A1 | 11/2018 | George | |
| 2019/0170007 A1 | 6/2019 | Davis | |
| 2019/0203842 A1 | 7/2019 | Bidkar | |
| 2022/0042423 A1 | 2/2022 | Hopper | |
| 2022/0412266 A1 | 12/2022 | Shealy | |
| 2022/0412464 A1 | 12/2022 | Shealy | |
| 2023/0054950 A1 | 2/2023 | Shealy | |

FOREIGN PATENT DOCUMENTS

| | | |
|---|---|---|
| EP | 2511481 | 10/2012 |
| EP | 3744964 | 12/2020 |
| EP | 4086436 | 11/2022 |
| KR | 100440720 | 3/2003 |

OTHER PUBLICATIONS

USPTO; U.S. Appl. No. 17/407439; Non-Final Office Action dated Dec. 9, 2022; (pp. 15)

USPTO; U.S. Appl. No. 17/567,385; Application filed Jan. 3, 2022, entitled "Plunger Seal Apparatus and Sealing Method".

USPTO; U.S. Appl. No. 17/567,385; Non-Final Office Action dated Mar. 8, 2023; (pp. 9).

USPTO; U.S. Appl. No. 17/578,717, Application filed Jan. 19, 2022, entitled "Seal Assembly and Sealing Method,".

USPTO; U.S. Appl. No. 17/578,717; Notice of Allowance dated Mar. 23, 2023; (pp. 12).

USPTO; U.S. Appl. No. 17/578,717; Notice of Allowance dated Dec. 12, 2022; (pp. 12).

USPTO; U.S. Appl. No. 17/578,717; Restriction Requirement dated Sep. 20, 2022; (pp. 7).

USPTO; U.S. Appl. No. 17/361,479; Notice of Allowance and Fees Due (PTOL-85) dated Jan. 31, 2023; (pp. 1-9).

USPTO; U.S. Appl. No. 17/361,479; Notice of Allowance and Fees Due (PTOL-85) dated Feb. 6, 2023; (pp. 1-2).

USPTO; U.S. Appl. No. 17/361,479; Notice of Allowance and Fees Due (PTOL-85) dated Apr. 13, 2023; (pp. 1-9).

USPTO; U.S. Appl. No. 17/362,391; Non-Final Rejection dated Jan. 31, 2023; (pp. 1-8).

USPTO; U.S. Appl. No. 17/362,391; Notice of Allowance Action dated May 11, 2023; (pp. 10).

USPTO; U.S. Appl. No. 17/407,439; Notice of Allowance and Fees Due (PTOL-85) dated Apr. 18, 2023; (pp. 1-9).

* cited by examiner

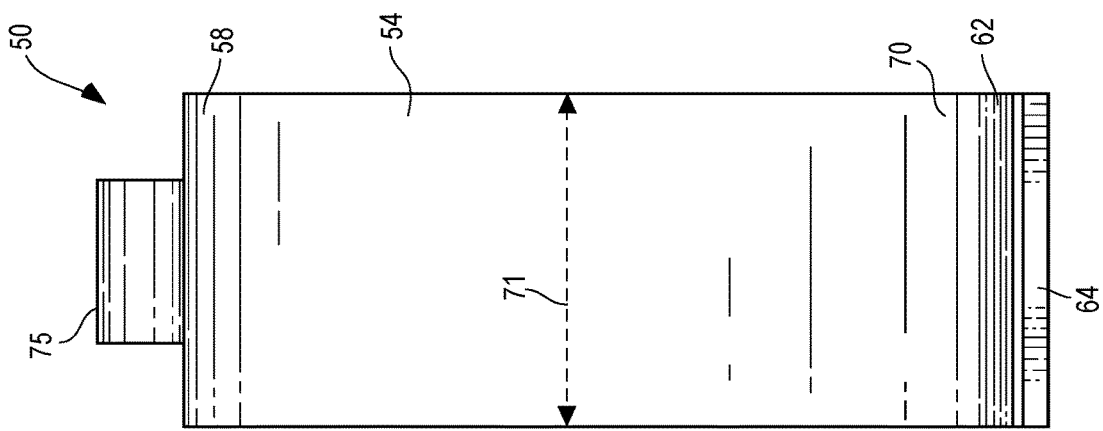
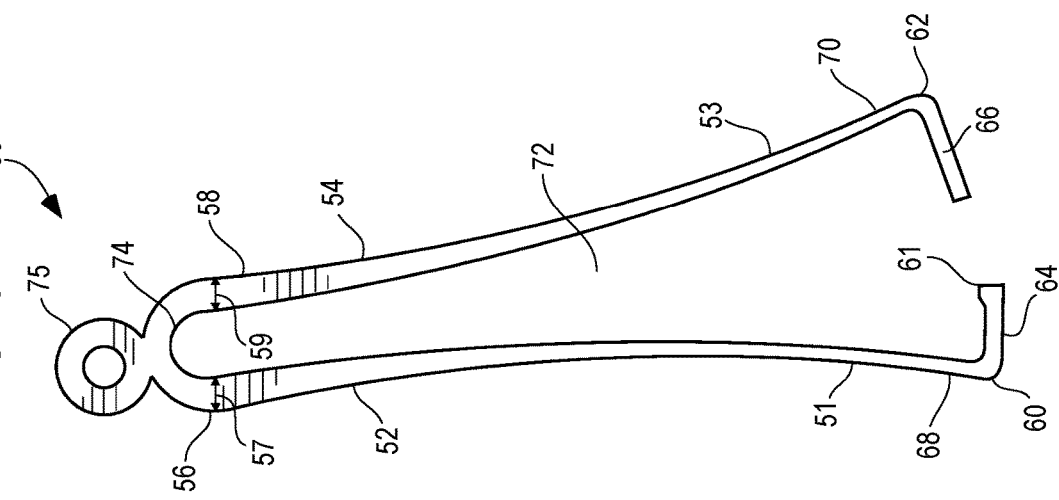

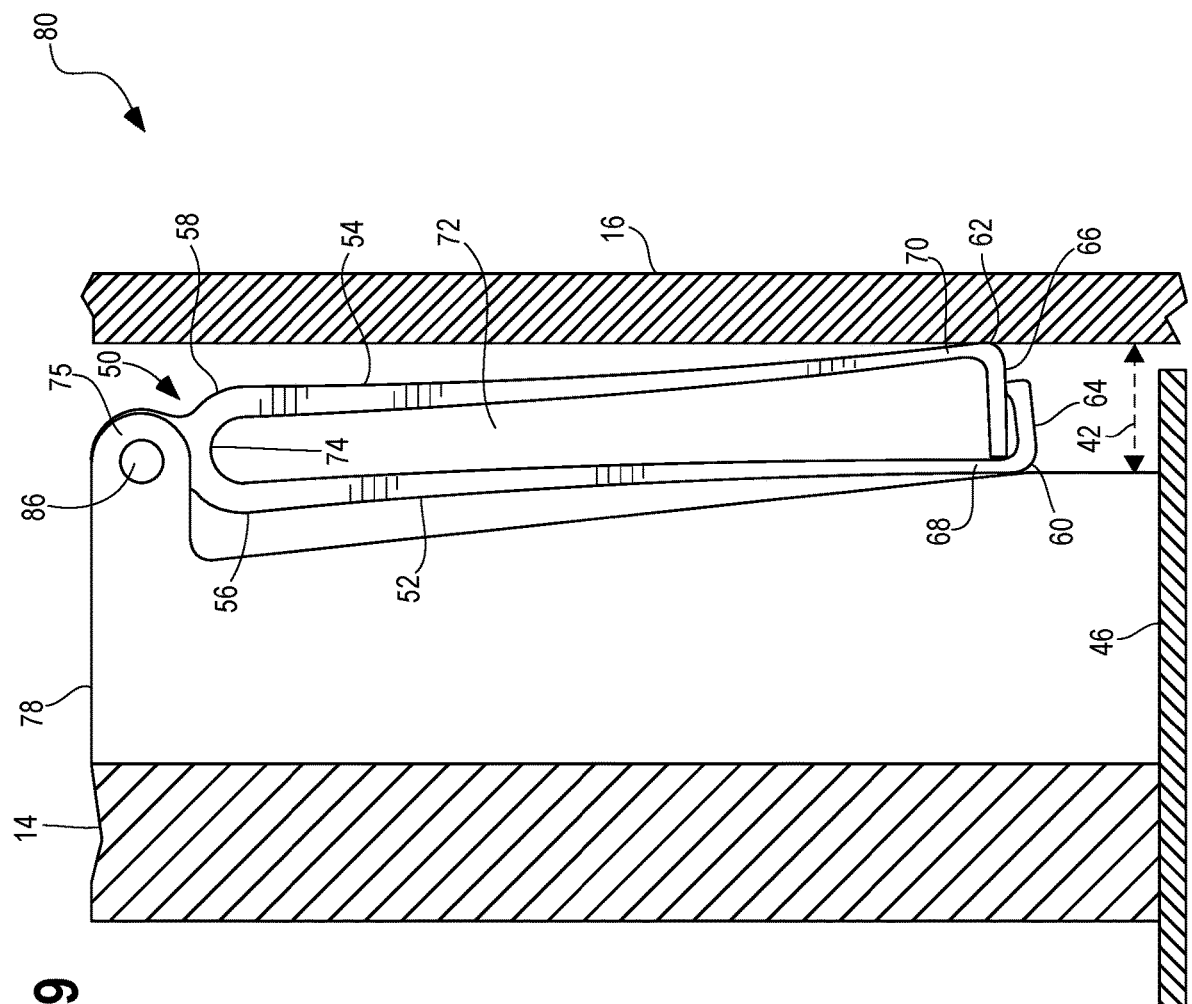

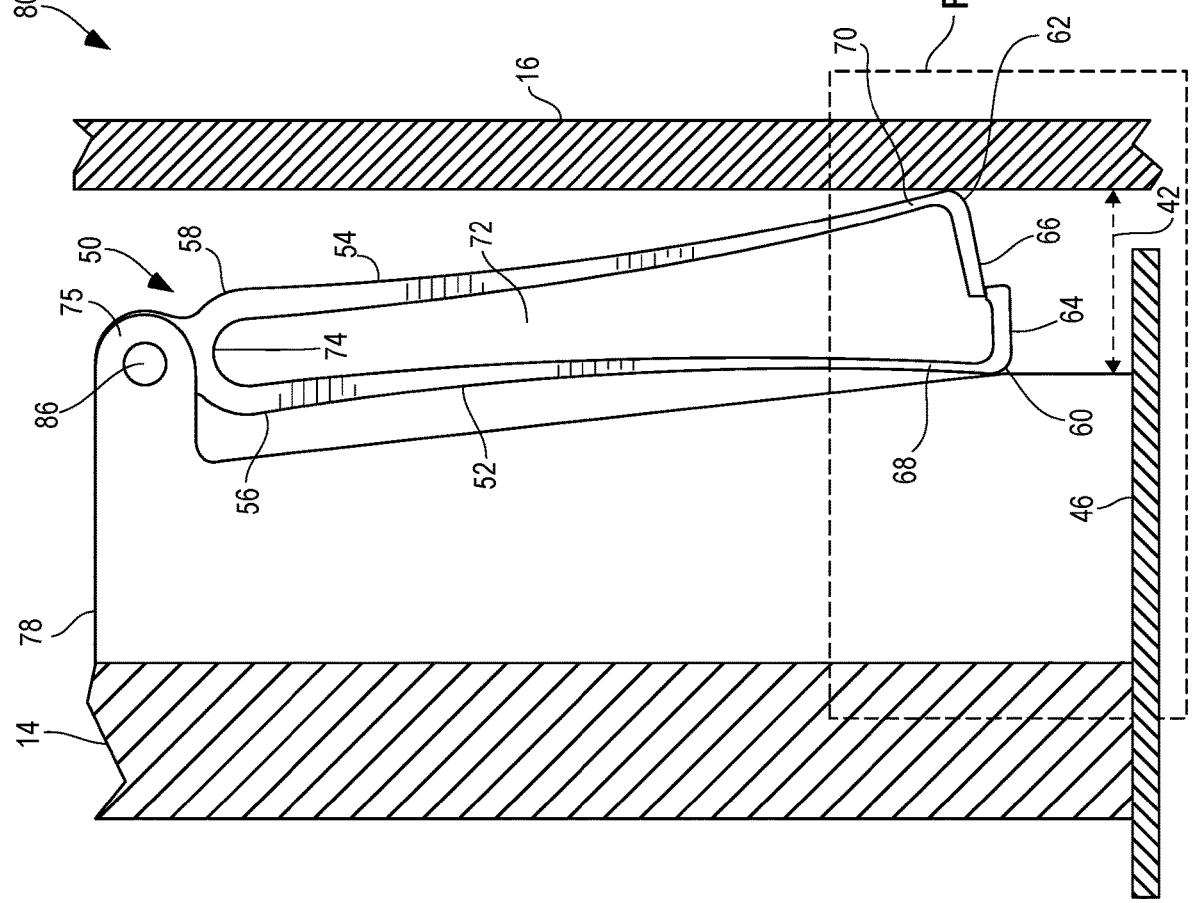

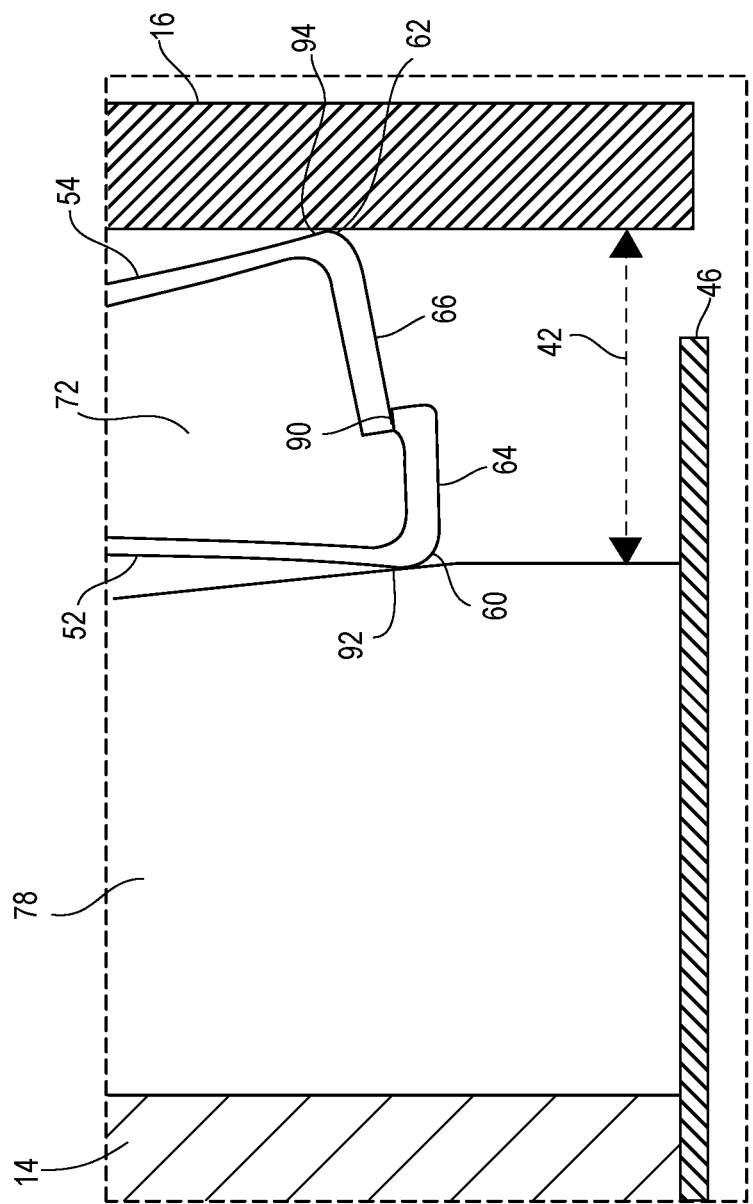

SKIRTED LEAF SEAL APPARATUS

GOVERNMENT INTERESTS

This invention was made with United States Government support. The Government has certain rights to this invention.

TECHNICAL FIELD

This technical field relates generally to dynamic seals for sealing a gap between a movable component and a stationary structure and, more specifically, to dynamic seals usable in a gas turbine engine exhaust nozzle.

BACKGROUND

A gas turbine engine, such as a gas turbine engine for powering an aircraft, may include an exhaust nozzle downstream of the turbine. The exhaust nozzle may include a movable flap positioned between the nozzle sidewalls. The flap may be actuated via a series of linkages to control a two-dimensional area within the nozzle to direct and accelerate the flow of core air from the engine for the purpose of thrust. Gaps between the flap and the nozzle sidewalls may create channels through which core air may flow, for example, due to a pressure gradient between the nozzle core and ambient environment surrounding the nozzle. Leakage of core air from the nozzle core to the ambient environment may reduce the thrust and efficiency of the engine.

BRIEF DESCRIPTION

Aspects and advantages of the present disclosure will be set forth in part in the following description, or may be obvious from the description, or may be learned through practice of the present disclosure.

In an aspect of the present disclosure, a seal apparatus for sealing a gap between a movable flap and a stationary structure includes a first seal having a first proximal end portion, a first distal end portion with a first bend, and a first skirt extending away from the first bend. The seal apparatus includes a second seal having a second proximal end portion, a second distal end portion with a second bend, and a second skirt extending away from the second bend, the second seal opposite the first seal and forming an interior space therebetween. The first seal biases away from the second seal to seal the gap.

In another aspect of the present disclosure, a gas turbine nozzle comprises a stationary sidewall, a movable flap adjacent the stationary sidewall, and a seal apparatus disposed between the stationary sidewall and the movable flap to seal a gap between the stationary sidewall and the movable flap. The seal apparatus is operably coupled to the moveable flap and includes a first seal having a first proximal end portion, a first distal end portion with a first bend, and a first skirt extending away from the first bend and a second seal having a second proximal end portion, a second distal end portion with a second bend, and a second skirt extending away from the second bend. The second seal opposite the first seal and forming an interior space therebetween and wherein the first seal biases away from the second seal to seal the gap.

In another aspect of the present disclosure, a method of sealing a dynamic gap using a seal apparatus includes the seal apparatus comprising a first seal having a first proximal end portion and a first distal end portion; and a second seal having a first proximal end portion and a second distal end portion, the second seal opposite the first seal and forming an interior space therebetween. The first seal naturally biases away from the second seal to seal a gap. The method includes contacting at least two surfaces of the gap with the first distal end portion and the second distal end portion and moving automatically at least the second distal end portion relative to one of the at least two surfaces in response to the gap changing size.

These and other features, aspects, and advantages of the present disclosure and/or embodiments will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling disclosure of the aspects of the present description, including the best mode thereof, directed to one of ordinary skill in the art, is set forth in the specification, which refers to the appended figures, in which:

FIG. 6 is a front, side elevation view of the seal of FIG. 5.

FIG. 7 is a right, side view of the seal of FIG. 5.

FIG. 9 is a front, side elevation view of a skirted leaf seal assembly including the seal of FIG. 5 showing the seal in a fully compressed state.

FIG. 10 is a front, side elevation view of a skirted leaf seal assembly including the seal of FIG. 5 showing the seal in a further expanded state.

FIG. 11 is an enlarged elevation view of the skirted leaf seal assembly of FIG. 10.

Figure 1:
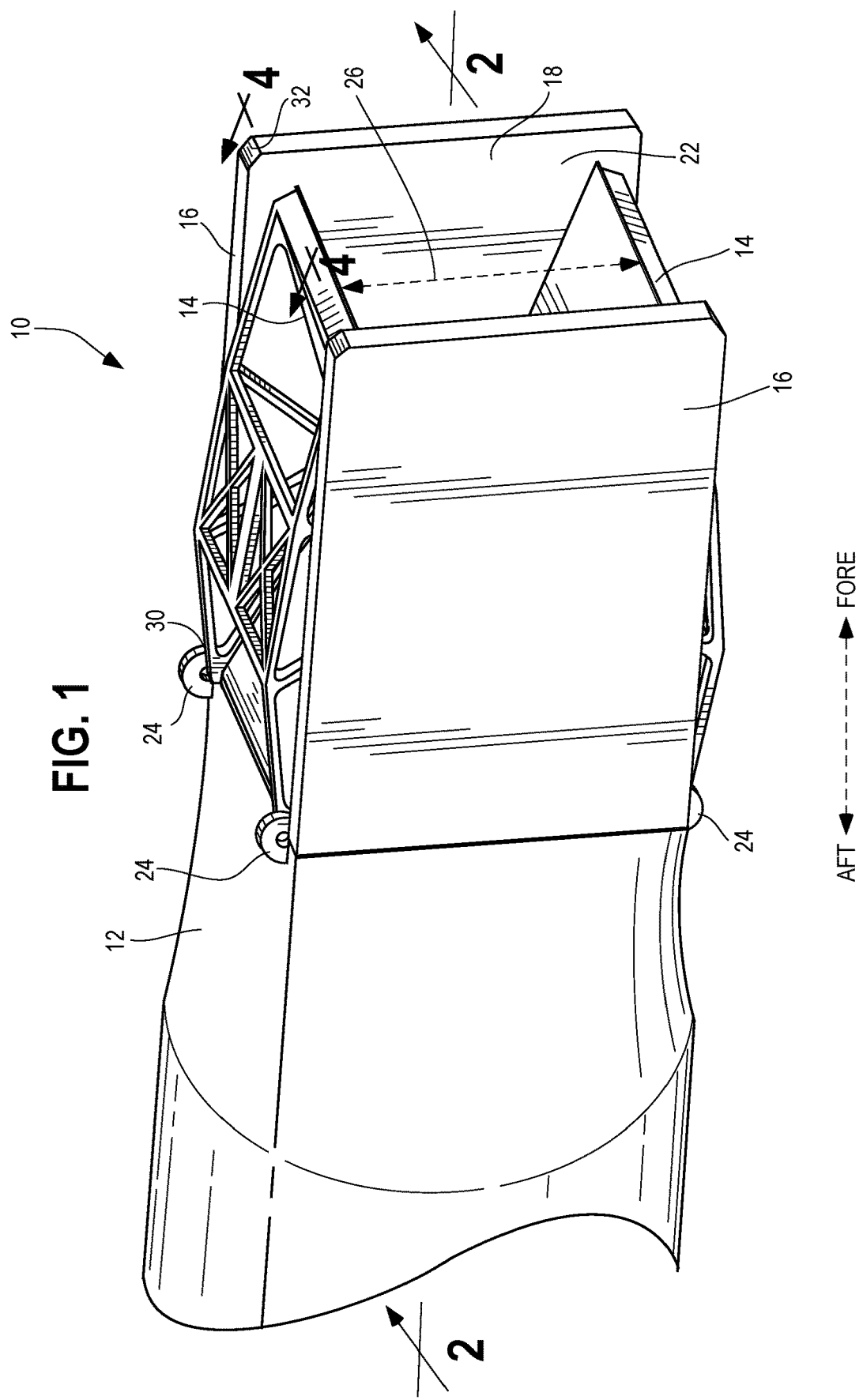
FIG. 1 is a perspective view of an exemplary gas turbine engine exhaust nozzle assembly, in accordance with some embodiments.

Elements in the figures are illustrated for simplicity and clarity and have not necessarily been drawn to scale. For example, the dimensions and/or relative positioning of some of the elements in the figures may be exaggerated relative to other elements to aid in understanding various embodiments. Also, common but well-understood elements that are useful or necessary in a commercially feasible embodiment are often not depicted to facilitate a less obstructed view of these various embodiments.

DETAILED DESCRIPTION

To reduce the size of gaps between the flap and the nozzle sidewalls and to seal core air within the nozzle core, a seal assembly may be positioned between the nozzle flap and the sidewall. In some instances, liners may be mounted to the nozzle sidewalls via one or more hangers. When the nozzle sidewall includes a liner, a seal assembly may be positioned between the flap and the sidewall liner, such that the seal seals against the sidewall liner rather than directly to the nozzle sidewall.

During operation of the nozzle, the flap may move in one or more directions relative to the nozzle sidewall. Thus, the seal assembly for the gap between the flap and the nozzle sidewall may need to facilitate sliding motion. For example, the seal assembly may need to facilitate the sliding of the seal assembly along the nozzle sidewall while still maintaining a seal between the nozzle flap and the sidewall.

In addition to accommodating sliding motion along the sidewall, the seal assembly may also need to accommodate dynamic variations in the size of the gap between the nozzle flap and the sidewall and/or the liner. For example, the sidewall liner may distort due to pressure and temperature variations within the nozzle. In addition, although generally stationary, the nozzle sidewall may also take on an uneven profile, deflect, or shift towards or away from the flap. Such distortions may impact the size of the gap between the flap and the nozzle sidewall and/or the liner. Accordingly, the seal assembly may need to accommodate for variations in the size of the gap between the flap and the nozzle sidewall and/or the liner. Further, the seal assembly may need to conform to the nozzle sidewall and/or liner when the nozzle sidewall and/or the liner, or portions thereof, distort or move.

Leaf seals may be used to seal the gap between a nozzle flap and a sidewall and/or a liner. The use of leaf seals over other types of seals is sometimes dictated by their unique low width to height form factor, fitting in narrow but tall spaces where other seals like plunger seals cannot fit. However, leaf seals may expose structure behind the seal to core air, as pressure gradients in the nozzle may drive core air into the cavity behind the leaf. In some cases, this may require purge air and use of additional shielding and/or baffling to protect the structure and hardware behind the leaf. Similarly, when the leaf seal includes a skirt to discourage core air entrainment behind the leaf, attempts to seal the skirt itself may add additional smaller and more sensitive seals that still must cope with high thermal variation, relative motion, acoustic, and pressure loads. These secondary seals must perform in a similar environment and to similar motion requirements as the primary leaf seal, while typically having less space to do so. In addition, a skirt typically results in decreased compliance of the primary sealing interface by stiffening a tip of the leaf.

Therefore, there remains a desire to have a dynamic leaf seal that more effectively and efficiently controls or prohibits core air from flowing both to the ambient at the nozzle and into the structure of the dynamic leaf seal itself, while minimizing the weight, performance loss, or hardware complexity involved in adding secondary seals and/or purge air.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

With reference to FIGS. 1-4, there is illustrated a gas turbine engine 12 that produces core air flow. At the aft of the gas turbine engine 12 is an adjustable nozzle assembly 10 to control the effect of the discharged core air. The adjustable nozzle assembly 10 includes upper and lower flaps 14 mounted for movement relative to one another between two opposing corresponding sidewalls 16. A gap 42 is located between outer edges of the flaps 14 and the corresponding sidewalls 16. This gap 42 would allow air to exhaust inefficiently to the ambient surroundings without seals. As illustrated in FIGS. 5-11, there is a dynamic leaf seal 50 at each of the gaps 42 that controls or even prevents this core air from exhausting to the surrounding. The dynamic leaf seal 50 includes a flap arm 52 that engages the flap 14 and a wall arm 54 that engages the sidewall 16. The seal 50 is resilient such that the flap arm 52 and the wall arm 54 bias away from one another when pre-loaded in the gap 42. Ends 68, 70 cooperate to control or prevent core air from entering an interior space 72 between the arms 52, 54. The resilient nature of the seal 50 allows the flap arm 52 and the wall arm 54 to adapt to distortion in the gap 42 created by the sidewalls 16 or liners 18 attached to the sidewalls via hangers 20.

With respect to FIG. 1, the flaps 14 are moveable relative the sidewalls 16, which may be generally stationary. By some approaches, the flaps 14 may be pivotally supported by the gas turbine engine 12 at the fore end 30 of the nozzle assembly 10. The flaps 14 may be pivotally supported, for example, by rotating means such as hinges 24 that couple the flaps 14 to the gas turbine engine 12. The flaps 14 and the sidewalls 16 define a nozzle core 22 that bounds core air exiting the gas turbine engine 12. Core air from the gas turbine engine 12 flows through the nozzle core 22 to create thrust for the gas turbine engine 12. Core air flows through the nozzle core 22 from a fore end 30 to an aft end 32 of the nozzle assembly 10. The aft end 32 of the nozzle assembly 10 defines a generally rectangular outlet 26 for discharging core air from the nozzle assembly 10 to the ambient environment. In some approaches, the flaps 14 are movable to direct the flow and pressure of core air within the nozzle core 22. For example, the flaps 14 may be vertically movable to adjust the size of the outlet 26 of the nozzle assembly 10.

Figure 2:
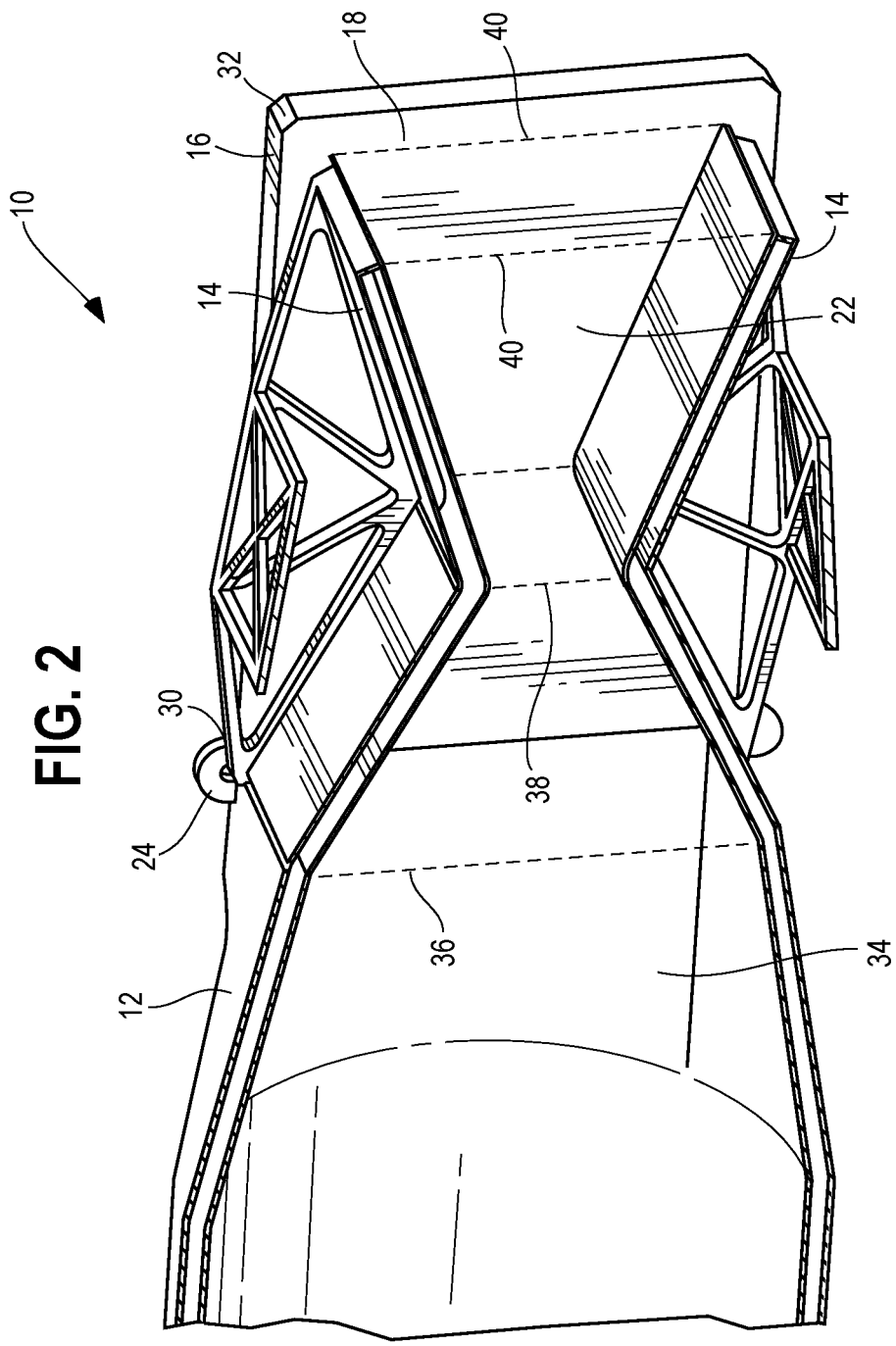
FIG. 2 is a cross-sectional view of the nozzle assembly of FIG. 1 taken along line 2-2 of FIG. 1.

Turning to FIG. 2, an engine core 34 of the gas turbine engine 12 is upstream of the nozzle assembly 10 such that core air flows from the engine core 34 into the nozzle core 22. In some embodiments, the flaps 14 of the nozzle assembly 10 are actuated to vary the one or more cross-sectional areas of the nozzle core 22. In this manner, the nozzle assembly 10 is a variable two-dimensional nozzle assembly. The flaps 14 may be actuated, for example by pivoting about the hinges 24. The nozzle core 22 includes a first cross-sectional area 36, a second cross-sectional area 38, and a third cross-sectional area 40. The flaps 14 control the size of the second cross-sectional area 38 and the third cross-sectional area 40.

During operation of the gas turbine engine 12, the flaps 14 create a pressure gradient in the nozzle core 22 of the nozzle assembly 10. For example, pressure of the core air in the nozzle core 22 decreases from the fore end 30 to the aft end 32 of the nozzle core 22. That is, the pressure of the core air decreases from the first cross-sectional area 36 to the second cross-sectional area 38 to the third cross-sectional area 40. The two-dimensional cross-section allows for different nozzle packaging and more readily adjustable cross-sectional areas 36, 38, 40 for matching both thrust and operability across the entire range of gas turbine engine operating conditions.

Figure 3:
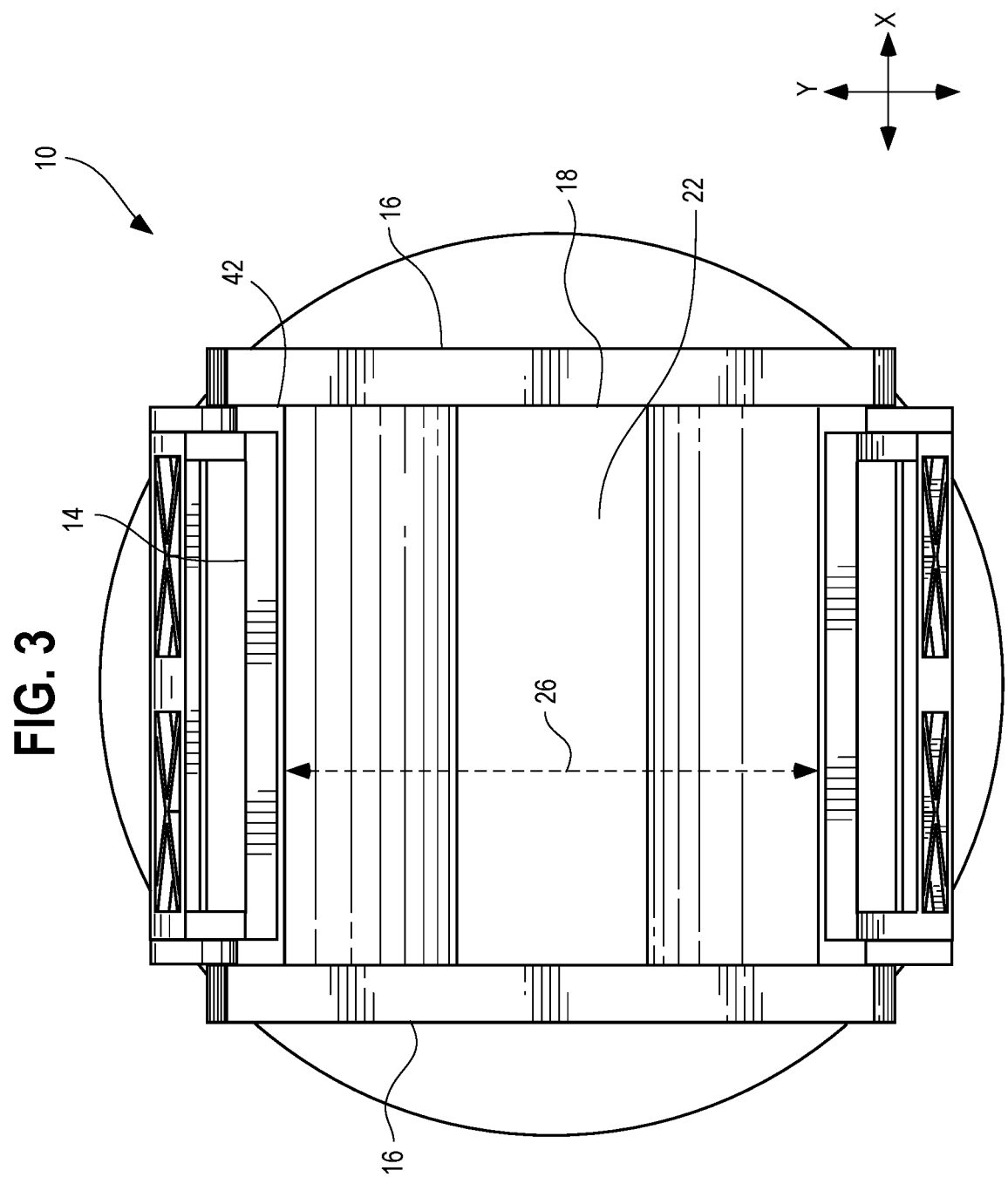
FIG. 3 is an end elevation view of the nozzle assembly of FIG. 1 taken from an aft end of the nozzle assembly.

Turning to FIG. 3, the gap 42 between the flap 14 and the sidewall 16 extends along the length of the flap 14 (i.e., from the fore end 30 to the aft end 32 of the nozzle assembly as shown in FIG. 1). The gap 42 may be continuous or interrupted at one or more locations. The size of the gap 42 may vary dynamically during operation of the nozzle assembly 10. During operation, the flaps 14 may move along the Y-direction shown in FIG. 3. This motion of the flaps 14, for example, varies the size of the outlet 26 of the nozzle assembly 10. Additionally, during operation, the sidewall 16 may shift along the X-direction shown in FIG. 3. For example, the pressure of core air in the nozzle core 22 may urge the sidewall 16 away from the flap 14, increasing the size of the gap 42. Accordingly, the gap 42 may be narrower when the nozzle core 22 is at atmospheric pressure than when the nozzle core 22 receives engine core air during operation of the nozzle assembly 10. In addition to motion of the sidewall 16, the liner 18 of the sidewall 16 may also distort during operation, causing the liner 18 to shift along one or more of the X-direction and Y-direction. Such liner distortion may occur, for example, due to changes in temperature and pressure along the nozzle core 22. A skirted leaf seal assembly 44 (not shown in FIG. 3) is installed in the gap 42 between the flap 14 and the sidewall 16. In some embodiments, the skirted leaf seal assembly 44 is the skirted leaf seal assembly 80 depicted in FIGS. 9 and 10.

Figure 4:
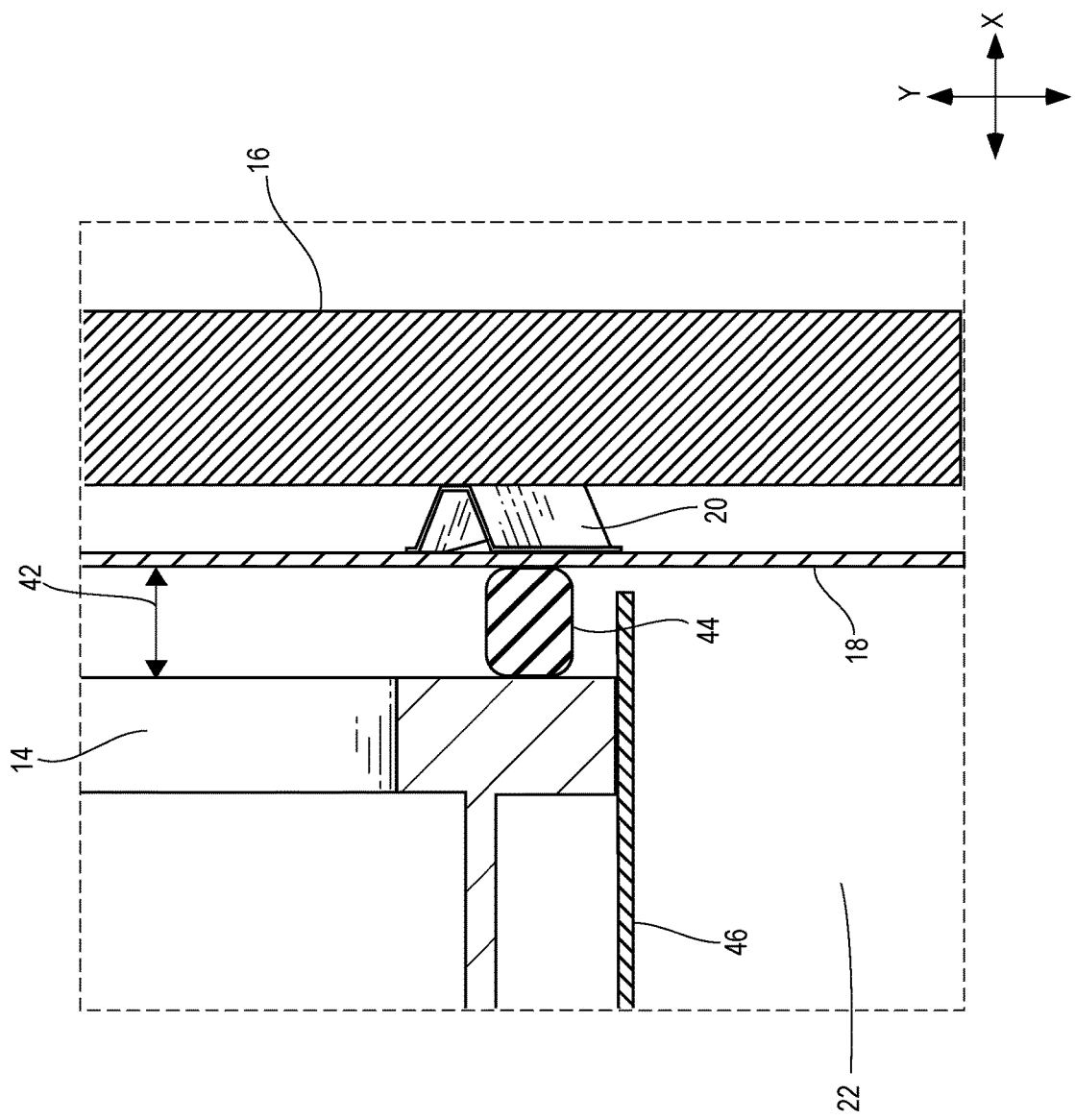
FIG. 4 is a cross-sectional view of section 4-4 of the nozzle assembly of FIG. 1.

With reference to FIG. 4, the gap 42 extends generally between the flap 14 and the sidewall 16. In the exemplary nozzle assembly 10, the sidewall 16 includes the liner 18, which is mounted to the sidewall 16 via the hangers 20. Accordingly, the gap 42 extends between the flap 14 and the liner 18. The flap 14 may further include a flap liner 46 positioned at an end of the flap 14 adjacent the nozzle core 22. The flap liner 46, or portions thereof, may extend into the gap 42. The nozzle assembly 10 includes a skirted leaf seal assembly 44 positioned in the gap 42 between the flap 14 and the sidewall 16. The skirted leaf seal assembly 44 bridges the gap 42 between the flap 14 and the sidewall 16 to seal the gap 42. The skirted seal assembly 44 may reduce the size of the gap 42 or eliminate the gap 42. In this manner, the seal assembly 44 reduces the excursion of core air from the nozzle core 22 through the gap 42 which may decrease or effect the flow of core air from the nozzle core 22 to the ambient environment surrounding the nozzle assembly 10. In some embodiments, the skirted leaf seal assembly 44 includes a skirted leaf seal, such as the skirted leaf seal 50 depicted in FIGS. 5-14.

Figure 5:
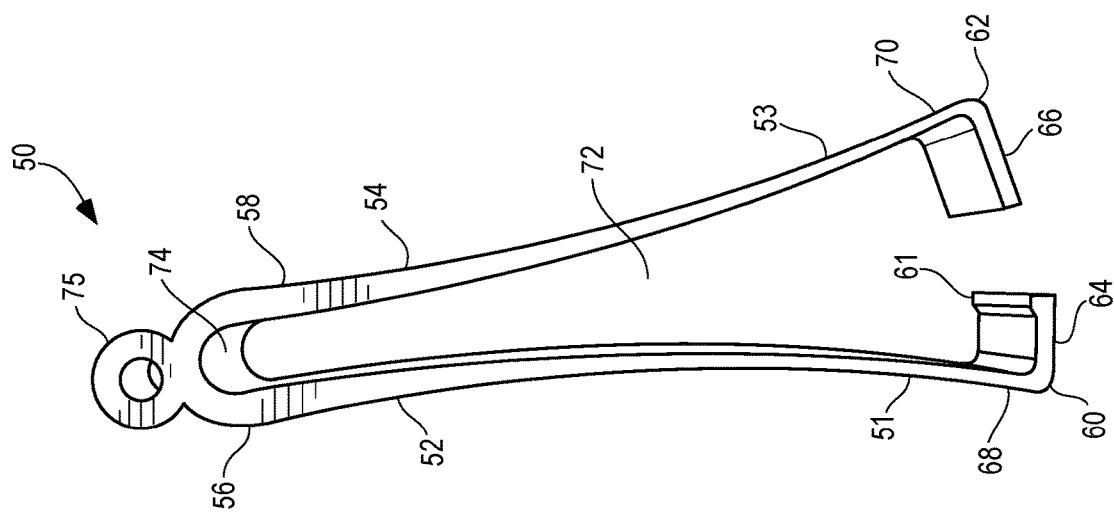
FIG. 5 is a perspective view of a dynamic skirted leaf seal, in accordance with some embodiments.

As shown in FIGS. 5 and 6, the exemplary dynamic skirted leaf seal 50 is a spring or a flexible, elastic device used to store mechanical energy. The skirted leaf seal 50 is resilient so that, when pre-loaded, the skirted leaf seal 50 exerts an outward, resilient force. The skirted leaf seal 50 may be pre-loaded in a gap, for example, as shown in FIGS. 9-11. The skirted leaf seal 50, in FIG. 5, is depicted in a free state, that is, without any external compression or forces being applied to the skirted leaf seal 50.

In some embodiments, the skirted leaf seal 50 or portions may be made as a flexure component, that is a flexible element engineered to be compliant in specific degrees of freedom. For example, the flexure of the leaf seal arms 52, 54 causes the first skirt 64 and the second skirt 66 to move in a predictable manner by restricting, relating, and defining the degrees of freedom of their motion through the shape of the components. That is, the components of the leaf seal 50 move and are related to each other through the bending and torsional strains inside each respective component. In this way, these components are flexurally related, and it is the flexural joints that constrain movement of the components as opposed to sliding movement.

In this manner, the skirted leaf seal 50 may undergo deformation and/or motion in specific degrees of freedom when an external force is applied to the skirted leaf seal 50. The arms 52, 54 of the skirted leaf seal 50 may be flexures that relate and restrict motion of the skirted leaf seal 50 to specific degrees of freedom such that an external force applied to the skirted leaf seal 50 is translated to predictable displacement or motion in the skirted leaf seal 50. The arms 52, 54 restrict, relate, and define the degrees of freedom for the motion of the skirted leaf seal 50 to seal the gap 42. Further the arms 52, 54 restrict, relate, and define the degrees of freedom for the motion of the first skirt 64 and the second skirt 66 to seal the interior space 72 within the skirted leaf seal 50.

The skirted leaf seal 50 includes the flap arm 52 and the wall arm 54. The flap arm 52 is positioned opposite the wall arm 54 and spaced from the wall arm 54. Together, the flap arm 52 and wall arm 54 define the interior space 72. The interior space 72 is bounded by the flap arm 52 and wall arm 54. The skirted leaf seal 50 is resilient such that the flap arm 52 and the wall arm 54 bias away from one another when pre-loaded in the gap 42. In some embodiments, the flap arm 52 and the wall arm 54 are flexurally related such that the constrain the movement of the first skirt 64 and the second skirt 66.

The flap arm 52 includes a proximal end portion 56, a distal end portion 68, and an intermediate portion 51 extending between the proximal end portion 56 and the distal end portion 68. The proximal end portion 56 is adjacent a housing or stationary structure to which the skirted leaf seal 50 is mounted, for example via an attachment member 75. The distal end portion 68 is free to move inward toward the wall arm 54, for example when an external force is applied to the flap arm 52 and the wall arm 54 is held stationary. The intermediate portion 51 may, in some forms, be concave or bend inwardly towards the interior space 72. The flap arm 52 may be an elongate sheet or leaf having a thickness 57. In some embodiments, the thickness 57 of the flap arm 52 may be greater at the proximal end portion 56 than at the distal end portion 68 of the flap arm 52. In certain embodiments, the thickness 57 of the flap arm 52 may gradually decrease from the proximal end portion 56 to the distal end portion 68. The decrease may be consistent or variable.

When installed in the gap 42 (see FIGS. 4, 9, and 10), a compressive load is applied to the distal end portion 68 of the flap arm 52. The flap arm 52 has a radius of curvature that causes the distal end portion 68 to protrude outwardly further than the intermediate portion 51. In this manner, the distal end portion 68 provides a determinate contact area for the flap 14, the housing 78, or another surface, to press against. This results in a determinate seal flexure. In some embodiments, the distal end portion 68 may further include one or more additional stocks or lands to further extend the distal end portion 68 beyond the intermediate portion 51. The additional stocks or lands may be used to compensate for the shape of the intermediate portion 51 or to provide additional wear-resistance.

The distal end portion 68 of the flap arm 52 includes a first bend area 60. The first bend area 60 is coupled to a first skirt 64. The first skirt 64 extends away from the first bend area 60 to define in part the interior space 72 of the skirted leaf seal 50. It is preferred that the bend (at area 60) between the first skirt 64 and the distal end portion 68 positions the first skirt 64 closest to the second skirt 66. Further, the preferred bend angle between the first skirt 64 and the distal end portion 68 would thus tend to be around 90 degrees or acute. Even further preferably, the first bend area 60 may position the first skirt 64 at an angle of about 45 to about 90 degrees relative to the flap arm 52 and, in some approaches, about 75 to about 90 degrees relative to the flap arm 52.

In some embodiments, the first skirt 64 of the flap arm 52 may further include a lip portion 61. The lip portion 61 may be a projection extending along a width of the first skirt 64. The lip portion 61 may be on a side of the first skirt 64 facing the interior space 72 and may be present anywhere along the first skirt 64; however, as shown in FIGS. 5 and 6, the lip portion 61 is disposed on a terminal end of the first skirt 64. Further, while only shown on the first skirt 64, a lip portion 61 may also be included on the second skirt 66.

The wall arm 54 includes a proximal end portion 58, a distal end portion 70, and an intermediate portion 53 extending between the proximal end portion 58 and the distal end portion 70. The proximal end portion 58 is adjacent a housing or stationary structure to which the skirted leaf seal 50 is mounted, for example, via the attachment member 75. The distal end portion 70 is free to move inward, for example, when an external force is applied to the wall arm 54. The intermediate portion 53 may, in some forms, be concave or bend inwardly towards the interior space 72.

In some approaches, the wall arm 54 may be shorter than the flap arm 52, that is, a distance from the proximal end portion 58 to the distal end portion 70 of the wall arm 54 may be less than a distance from the proximal end portion 56 to the distal end portion 68 of the flap arm 52. However, it is also contemplated that the wall arm 54 may be longer than the flap arm 52. In this manner, the first skirt 64 may be positioned on either side of the second skirt 66 (see FIGS. 12-14). The wall arm 54 may be an elongate sheet or leaf having a thickness 59. FIG. 7 depicts a side view of the skirted leaf seal 50, illustrating the wall arm 54 comprising an elongate sheet. In some embodiments, the thickness 59 of the wall arm 54 may be greater at a proximal end portion 58 than at the distal end portion 70 of the wall arm 54 (FIG. 6). In certain embodiments, the thickness 59 of the wall arm 54 may gradually decrease from the proximal end portion 58 to the distal end portion 70. The decrease in thickness may be constant or variable.

When installed in the gap 42 (see FIGS. 4, 9, and 10), a compressive load is applied to the distal end portion 70 of the wall arm 54. The wall arm 54 has a radius of curvature that causes the distal end portion 70 to protrude outwardly further than the intermediate portion 53. In this manner, the distal end portion 70 provides a determinate contact area for the sidewall 16, or another surface, to press against. This results in a determinate seal flexure. In some embodiments, the distal end portion 70 may further include one or more additional stocks or lands to further extend the distal end portion 70 outwardly beyond the intermediate portion 53. The additional stocks or lands may be used to compensate for the shape of the intermediate portion 53 or to provide additional wear-resistance.

The distal end portion 70 of the wall arm 54 includes a second bend area 62. The second bend area 62 is coupled to the second skirt 66. The second skirt 66 extends away from the second bend area 62 to form in part the interior space 72 of the skirted leaf seal 50. The second bend area 62 may position the second skirt 66 at an angle of about 45 to about 90 degrees relative to the wall arm 54 and, in some approaches, about 75 to about 90 degrees relative to the wall arm 54.

The proximal end portion 56 of the flap arm 52 is coupled to the proximal end portion 58 of the wall arm 54. A connecting portion 74 couples the proximal end portion 56 of the flap arm 52 to the proximal end portion 58 of the wall arm 54. In some embodiments, the connecting portion 74 is generally U-shaped. In this manner, the connecting portion 74 orients the flap arm 52 and the wall arm 54 to form a hairpin-shape. In some embodiments, the connecting portion 74 enables the flap arm 52 and the wall arm 54 to collapse flat or parallel upon full compression; that is, to be configured with the leaf seal 50 having a generally constant width between the flap 14 and the sidewall 16, as seen in FIG. 9 for example.

In some forms, a distance between the proximal end portion 56 of the flap arm 52 and the proximal end portion 58 of the wall arm 54 may be shorter than a distance between the distal end portion 68 of the flap arm 52 and the distal end portion 70 of the wall arm 54 when the skirted leaf seal 50 is in a free state. In some embodiments, the flap arm 52 and the wall arm 54 are formed of a monolithic, or unitary, piece of material. A monolithic construction may simplify manufacturing of the skirted leaf seal 50, for example, by eliminating or reducing the need for riveting or welding. Monolithic, as used herein, refers to a unitary structure lacking interfaces or joints by virtue of the materials of each layer fusing to or melting with the materials of adjacent layers such that the individual layers lose their identity in the final unitary structure.

In some embodiments, when the skirted leaf seal 50 is in a free state (as shown in FIGS. 5 and 6), the first skirt 64 and the second skirt 66 are not in contact and/or do not overlap. However, when forces are applied to one or both of the flap arm 52 and the wall arm 54, the flap arm 52 may engage or overlap with the wall arm 54. In some embodiments, the lip portion 61 may engage the second skirt 66 when an external force is applied to one or both of the flap arm 52 and the wall arm 54. Including a lip portion 61 on the first skirt 64 may reduce the risk of binding between the flap arm 52 and wall arm 54 because of the reduced surface area in contact. The projected lip portion 61 provides a determinate seal land that makes the leakage and/or contact between the first skirt 64 and the second skirt 66 more predictable. It is contemplated that the connecting portion 74 may relate external forces applied to one or both of the flap arm 52 and the wall arm 54. Forces may be applied to one or both of the flap arm 52 and the wall arm 54, for example, when the skirted leaf seal 50 is installed in a gap, such as the gap 42 between the flap 14 and the sidewall 16, as depicted in FIGS. 9 and 10.

Further, the shape of the second skirt 66 and the first skirt 64 are shaped to maintain a consistent distance between the second skirt 66 and the first skirt 64 when overlapping. In some embodiments, when overlapping, the second skirt 66 and the first skirt 64 may be in contact. In other embodiments, when overlapping, the second skirt 66 and the first skirt 64 may be metered or tightly gapped.

As shown in FIGS. 5 and 6, the skirted leaf seal 50 further includes the attachment member 75. In some aspects, the attachment member 75 is monolithic with the skirted leaf seal 50. The attachment member 75 attaches the skirted leaf seal 50 to a structure, such as a movable flap or other structure. In some approaches, the attachment member 75 attaches the skirted leaf seal 50 directly to a movable flap or other structure. In other approaches, the attachment member 75 attaches the skirted leaf seal 50 to a housing 78 associated with the movable flap or other structure. The attachment member 75 may be any mechanism suitable to attach or couple the skirted leaf seal 50 to a structure. In some embodiments, the attachment member 75 hingedly or rotatably attaches the connecting portion 74 of the skirted leaf seal 50 to a structure, such as the flap 14 or other structures. In this manner, connecting portion 74 of the skirted leaf seal 50 is able to rotate or pivot about the attachment member 75. The attachment member 75 may be, for example, a hinge comprising a knuckle and a pin, a resilient and/or flexural hinge, or through other rotationally coupled mechanisms. In some aspects, the attachment member 75 is a hinge comprising a knuckle or hollow tube forming the body of the hinge through which a pin may be inserted to couple the skirted leaf seal 50 a structure, such as the flap 14 or the housing 78. The attachment member 75 reacts-out vertical pressure and frictional loads applied to the skirted leaf seal 50. For example, the attachment member 75 operates to counteract core pressure within a nozzle of a gas turbine engine engaging an outward facing surface of the first and second skirts 64, 66. Due to the general radially equal contact surface of the distal ends 68, 70, the movement from the resilient reaction forces is small and creates little horizontal load on the attachment member 75.

In some embodiments, the skirted leaf seal 50 may be made of any suitable metallic or ceramic materials or combinations thereof. Materials used to make the skirted leaf seal 50 may be selected to withstand the elevated temperatures of hot engine core air that may be in contact with the skirted leaf seal 50, such as core air from a gas turbine engine nozzle assembly such as that of FIG. 1. Furthermore, faying surfaces or hot core air exposed surfaces may be coated to enhance seal corrosion capability, wear resistance, or other seal performance or durability qualities. It is also contemplated that, in some embodiments, when the skirted leaf seal 50 is employed in a high temperature environment such as a gas turbine engine nozzle assembly, the skirted leaf seal 50, or portions thereof such as exterior or core-exposed surfaces, may not include viscoelastic materials such as rubber or polymers, as such materials may not be capable of withstanding high temperatures.

Turning to FIG. 7, the wall arm 54 is an elongate sheet or leaf and, in some embodiments, is generally rectangular in shape. While not shown in FIG. 7, the flap arm 52 may be generally the same shape as the wall arm 54. However, it is also contemplated that the flap arm 52 and the wall arm 54 may have different shapes or different widths 71 when viewed from the side. The first skirt 64 extends below the second skirt 66. The width of the seal 71 or the width of the wall arm 54 and the flap arm 52 (not shown in FIG. 7) may vary. A structure having more deformations or variations in gap size may employ more skirted leaf seals 50 having a narrower width 71. Employing more skirted leaf seals 50 having a narrower width 71 may enable the wall arm 54 of the seal 50 to conform more closely to the shape of the structure and the gap. A structure having fewer deformations or variations in gap size may employ fewer skirted leaf seals 50 having a wider width 71.

In some embodiments, the wall arm 54 may be a shaped sheet and/or may include one or more notches or cut-outs. Differences in the shape of the cause the wall arm 54 to differ flexurally. The shape of the sheet impacts the compliance of the arm 54. For example, a sheet that includes notches and/or cut-outs is more compliant and free to twist than a sheet without notches or cut-outs, such the wall arm 54 in FIG. 7. Including cut-outs or notches also increases its freedom of motion of the sheet as a flexure. Adding cut-outs or notches will also change the stresses in the arm 54 and reduce the force exerted by the arm 54 when under compression.

It is contemplated that one or more skirted leaf seals 50 may be coupled together along a length (i.e., from a fore to an aft end) of a flap, such as the flap 14 in the nozzle assembly 10 of FIG. 1. One or more skirted leaf seals may be directly coupled together or may be positioned adjacent each other along the length of the flap. In some approaches, a narrower width 71 is employed to allow a plurality of skirted leaf seals 50 to more closely follow the profile of the structure against which the skirted leaf seals 50 are positioned.

Figure 8:
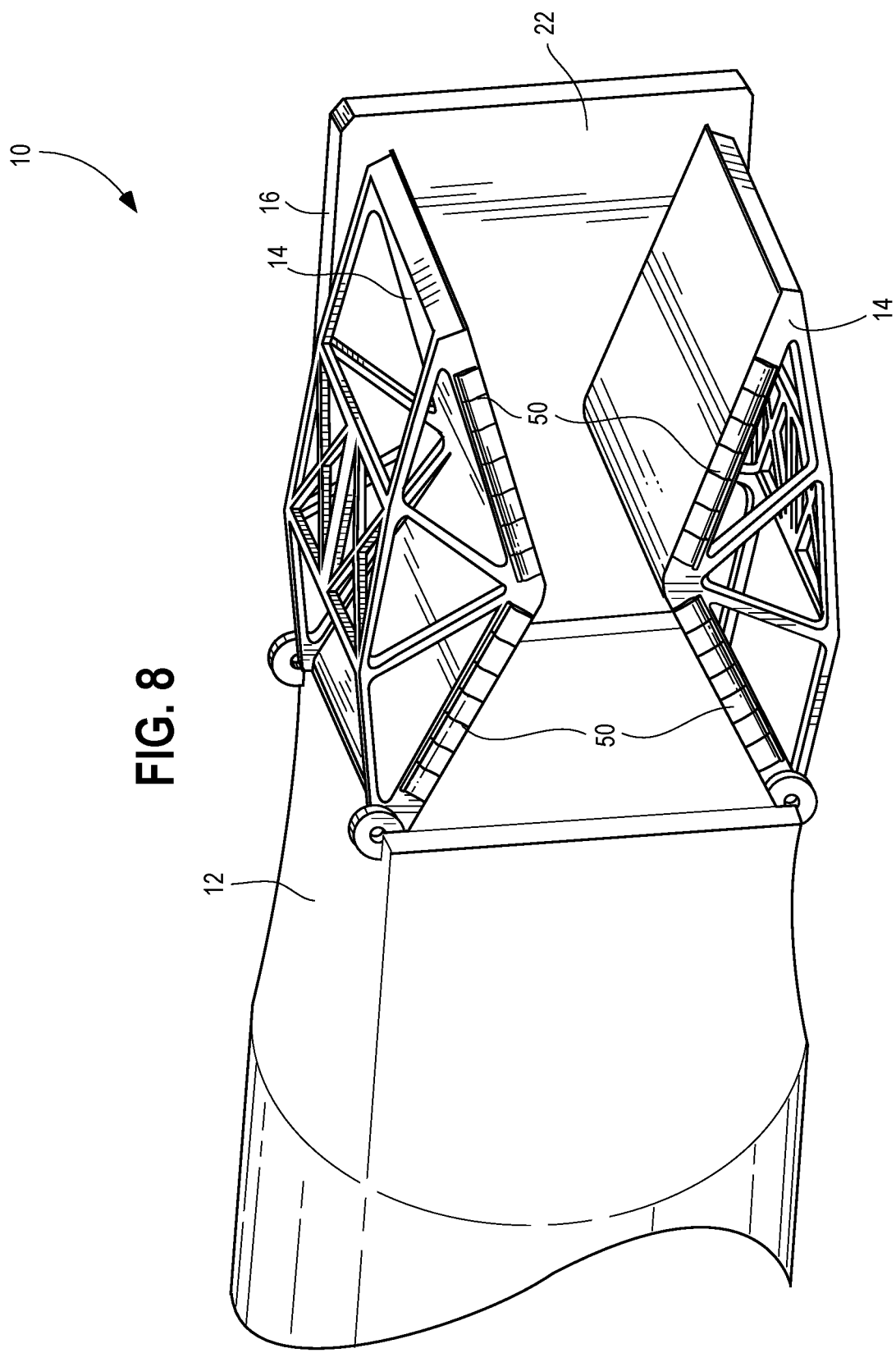
FIG. 8 is a perspective view of a series of the skirted leaf seals of FIG. 5 installed in the nozzle assembly of FIG. 1.

Illustrated in FIG. 8 is an exemplary installation of a series of skirted leaf seals 50. The series of skirted leaf seals 50 is installed on the flap 14 of the nozzle assembly 10 depicted in FIG. 1. The skirted leaf seals 50 are butted or precisely spaced along the edge of the flap 14. It is also contemplated that the seals may be joined to one another using lapped joints or other labyrinthine features. Such lapped joints or labyrinthine features may be employed to discourage core air from bypassing the skirted leaf seals 50. As shown, the series of seals is installed linearly along the edge of the flap. No skirted leaf seals 50 are installed on the curved elbow of the flap 14. In some embodiments, two separate series of skirted leaf seals 50 may be joined by a separate transition seal at the curved elbow of the flap 14. Such transitions seals may be labyrinthine or intermediate seals to transition one linearly installed series of skirted leaf seals 50 to another linearly installed series of skirted leaf seals 50.

In some embodiments, the skirted leaf seal 50 is installed in the gap 42 between the flap 14 and the sidewall 16 of the nozzle assembly 10 of FIG. 1. When in installed in the gap 42, the skirted leaf seal 50 exerts a force to urge the flap arm 52 towards the flap 14 and to urge the wall arm 54 towards the sidewall 16. In this manner, the skirted leaf seal 50 may be employed to seal the gap 42 between the flap 14 and the sidewall 16.

Turning to FIGS. 9 and 10, the skirted leaf seal 50 is installed in the gap 42 between the flap 14 and the sidewall 16. All descriptions related to the nozzle assembly of FIG. 1 may apply to the following figures unless specifically stated otherwise. The skirted leaf seal 50 is attached to a housing 78 in a seal assembly 80. In the embodiment shown in FIGS. 9 and 10, the housing 78 is mounted to the flap 14. However, it is also contemplated that the housing 78 may be integral with or part of the flap 14, such that the skirted leaf seal 50 is attached directly to the flap 14. The housing 78 may be mounted to the flap 14 via any suitable mounting mechanism, for example, by welding, rivets, nuts and bolts, or stud mounting. Although FIGS. 9 and 10 depict the flap arm 52 adjacent the flap 14 and the wall arm 54 adjacent the sidewall 16, this configuration may be reversed.

The flap 14 includes the flap liner 46. The skirted leaf seal 50 is sized such that the first skirt 64 is recessed behind the flap liner 46. In this manner, the first skirt 64 may be positioned adjacent to the sidewall 16 without concern for contacting the sidewall 16, which may be subject to motion or distortions. This configuration also reduces the area at the distal end of the skirted leaf seal 50 that is exposed to leakage from the nozzle core to the interior space 72 or to the ambient environment surrounding the skirted leaf seal 50.

The housing 78 may include a cantilever 86. The cantilever 86 projects away from the housing 78 into the gap 42 between the flap 14 and the sidewall 16. In some embodiments, the cantilever 86 is positioned at an angle of about 90 degrees relative to the flap 14. The skirted leaf seal 50 is attached to the cantilever 86 via the attachment member 75. As discussed above, the attachment member 75 may hingedly or rotatably attach the skirted leaf seal 50 to the cantilever 86. In this manner, the attachment member 75 allows the skirted leaf seal 50 to pivot at the cantilever 86. In this manner, the skirted leaf seal 50 may move towards or away from the sidewall 16, for example, to accommodate variations in the size of the gap 42.

When installed within the gap 42, as shown in FIGS. 9 and 10, the skirted leaf seal 50 is in a state of compression. The skirted leaf seal 50 or portions thereof are resilient such that the skirted leaf seal 50 has memory such that when removed from the gap 42 it would move back to its free state after. In a state of compression, the skirted leaf seal 50 is pre-loaded and creates an outward force where the flap arm 52 urges against the flap 14 and the wall arm 54 urges against the sidewall 16. In this manner, the forces exerted by the skirted leaf seal 50 seal the gap 42 between the flap 14 and the sidewall 16.

To provide resiliency, the skirted leaf seal 50 may be made from one or more resilient materials. By way of non-limiting examples, the skirted leaf seal 50 may be made from superalloys, ceramic materials, or combinations thereof.

The forces exerted by the skirted leaf seal 50 are generated within the skirted leaf seal 50 by the flexing and/or compression of the material of the skirted leaf seal 50. The loading of the flap arm 52 at the interface between the flap 14 and the flap arm 52 seals the space between the flap arm 52 and the flap 14 or, when present, the housing 78. Similarly, the loading of the wall arm 54 at the interface between the sidewall 16 and the wall arm 54 seals the space between the wall arm 54 and the sidewall 16. This interface loading is caused by the biasing of the arms 52, 54 is a result of the material itself, the offset between the wall arm 54 and the flap arm 52, and the length, taper, and thickness of the arms 52, 54.

The bias of the arms 52, 54 and accordingly the force output, may be adjusted based on the mechanical relationship between the arms 52, 54 and the relative length and thickness of the arms 52, 54. The amount of horizontal motion and load in a particular application will define the length, thickness, and taper of the arms 52, 54 needed to maintain resiliency under operating conditions. The thicker and shorter the arms 52, 54, the more load required to deflect the seal. With respect to thickness, when the arms 52, 54 are thicker, they may exert a greater force output and increase the preload requirements (i.e., requirements to compress the skirted leaf seal 50). With respect to length, when the arms 52, 54 are shorter, they may exert a greater force and increase the preload requirements (i.e., the requirements to compress the skirted leaf seal 50).

The connecting portion 74, in part, defines the mechanical relationship between the arms 52, 54. The connecting portion 74 relates the movement of the arms 52, 54 such that loading the distal end 70 of the wall arm 54 causes both the flap arm 52 and the wall arm 54 to rotate about the attachment member 75. Loading one or more of the arms 52, 54 causes the skirted leaf seal 50 to flex and rotate about the hinge or attachment member 75.

The attachment member 75 provides a method of reacting frictional forces, locating the part, and interfacing with the flap 14 but does not change the operation of the seal 50 itself.

As long as the compression load goes predominantly through the first bend area 60 and distal end 70, and the friction and pressure load is reacted out through the attachment member 75 for the first end area 60 with the others allowed to slide, the seal 50 functions optimally. In the state shown in FIG. 9, the sidewall 16 may be in contact with the second bend portion 62 of the wall arm 54. Further, other portions of the wall arm 54 may be in contact with the sidewall 16 when the skirted leaf seal 50 is in a fully compressed state. The sidewall 16, or a portion thereof, for example has shifted towards the flap 14, compressing the skirted leaf seal 50 and decreasing the size of the gap 42.

As illustrated in FIG. 10, the skirted leaf seal assembly 80 with the skirted leaf seal 50 is in a further expanded state relative to that shown in FIG. 9. In this further expanded state, the skirted leaf seal 50 is still compressed (and pre-loaded) relative to its free state. The sidewall 16 also is in contact with the wall arm 54 and the housing 78 (or the movable flap 14) is in contact with the flap arm 52. More specifically, the sidewall 16 is in contact with the second bend portion 62 of the wall arm 54; however, other portions of the wall arm 54 may be in contact with the sidewall 16 when the skirted leaf seal 50 is in the further expanded state. The sidewall 16, or a portion thereof, for example has shifted away from the flap 14, de-compressing the skirted leaf seal 50 and increasing the size of the gap 42.

In some approaches, the skirted leaf seal 50 may be sized to maintain overlap between the first skirt 64 and second skirt 66 when the skirted leaf seal 50 is in the further expanded state. In this manner, the first skirt 64 remains in contact and/or maintains the metered gap with the second skirt 66. With respect to sizing the skirted leaf seal 50, the length of the flap arm 52 and the wall arm 54 may be adjusted to provide durability or to sufficiently seal the gap 42. For example, shorter arms 52, 54 may provide more durability than longer arms in applications subject to large amounts of motion in the flap 14 and/or the sidewall 16.

With reference to FIG. 11, the flap arm 52 engages the wall arm 54 at a distal end portion of the leaf seal assembly 80 in the further expanded state. In some embodiments, the skirted leaf seal 50 seals the gap 42 between the flap 14 and sidewall 16 via three surfaces or edges of contact. More specifically, the skirted leaf seal 50 seals the gap via a first surface or edge of contact 90, a second surface or edge of contact 92, and a third surface or edge of contact 94.

The flap arm 52 engages the wall arm 54 at the first surface or edge of contact 90. In particular, the first skirt 64 of the flap arm 52 engages the second skirt 66 of the wall arm 54 at the first surface or edge of contact 90. The first surface or edge of contact 90 may prevent or reduce the flow of core air into the interior space 72 between the flap arm 52 and the wall arm 54. It is contemplated that by including the first surface or edge 90 between the first skirt 64 and second skirt 66, a separate seal assembly may not be required, for example, to seal the interior space 72 (i.e., the area behind the wall arm 54 or leaf) of the skirted leaf seal 50.

The skirted leaf seal 50 resiliently relates the first skirt 64 to the second skirt 66. In some embodiments, the flap arm 52 may slidingly engage the wall arm 54 at the first surface or edge of contact 90. By slidingly engaging the flap arm 52, the wall arm 54 may accommodate for variations in the size of gap 42. Further, such sliding engagement allows the first skirt 64 and second skirt 66 to move relative each other, for example, in response to movement, shifting, or other distortions in the sidewall 16.

The flap arm 52 also engage the housing 78 at the second surface or edge of contact 92. In particular, the first bend area 60 of the flap arm 52 engages the housing 78 at the first edge of contact 92. In some embodiments, such as the embodiment depicted in FIG. 11, the skirted leaf seal 50 is mounted to the flap 14 via a housing 78. Accordingly, in some embodiments, the second edge of contact 92 is between the flap arm 52 and the housing 78. However, it is also contemplated that in, other embodiments, the skirted leaf seal 50 is mounted directly to the flap 14. In these other embodiments, the second edge of contact 92 is between the flap arm 52 and the flap 14. The second edge of contact 92 seals a space between the flap 14 and the flap arm 52. To create the second edge of contact 92, the skirted leaf seal 50 exerts a force that urges the flap arm 52 towards the flap 14.

The wall arm 54 engages the sidewall 16 at the third surface or edge of contact 94. In particular, the second bend area 62 of the wall arm 54 engages the sidewall 16 at the third edge of contact 94. In some embodiments, such as the embodiment depicted in FIG. 4, when the sidewall 16 is the sidewall of a nozzle assembly, the stationary structure includes a liner. Accordingly, in some embodiments, the third edge of contact 94 is between the wall arm 54 and the liner (e.g., the liner 18 of FIG. 4). However, it is also contemplated that, in other embodiments, the sidewall 16 does not include a liner. In these other embodiments, the third edge of contact 94 is between the wall arm 54 and the sidewall 16. The third edge of contact 94 seals a space between the sidewall 16 and the wall arm 54. To create the third edge of contact 94, the skirted leaf seal 50 exerts a force that urges the wall arm 54 towards the sidewall 16. The force, for example, may be a material bias that is balanced between the second edge of contact 92 and the third edge of contact 94. Because the skirted leaf seal 50 is pre-loaded and the flap arm 52 and wall arm 54 are resiliently related, a separate spring may not be required, for example in interior space 72, to urge the wall arm 54 towards the sidewall 16 to maintain the third edge of contact 94.

In some embodiments, it is contemplated that the first skirt 64 and second skirt 66 may not be in direct contact at the first surface or edge of contact 90 but, rather, may be metered or tightly gapped. In this manner, the surface or edge 90 may be a metered gap that discourages air flow around the first skirt 64 and the second skirt 66 into the interior space 72. In general, the metered gap at the first surface edge of contact 90 is less than about 5 thousandths of an inch (mils). In some approaches, the metered gap at the first surface or edge of contact 90 may be between about 1 and 10 mils, about 1 and 5 mils, and, in some aspects, about 1 and 3 mils. Accordingly, in such an embodiment, the skirted leaf seal 50 seals the gap 42 via two edges of contact—the second edge of contact 92 and the third edge of contact 94. A configuration utilizing a metered gap at the first surface or edge of contact 90 may reduce friction between the first skirt 64 and the second skirt 66 and may also reduce risk of the first skirt 64 binding the second skirt 66.

Maintaining a constant yet small metered gap between the first skirt 64 and the second skirt 66 eliminates friction between the skirts 64, 66 and reduces the risk of binding. The metered gap also reduces wear and performance degradation of the skirts 64, 66. In some applications, a metered gap resulting in a small, yet predictable leak and low risk of binding is preferable over a better seal with frictional contact between the skirts 64, 66.

Figure 14:
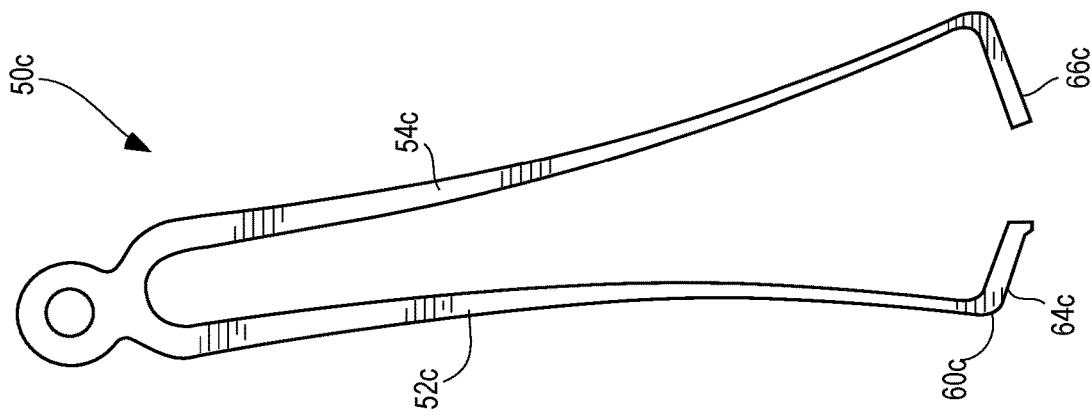
FIG. 14 is a front, side elevation view of another embodiment of a skirted leaf seal including an angled skirt.
Figure 13:
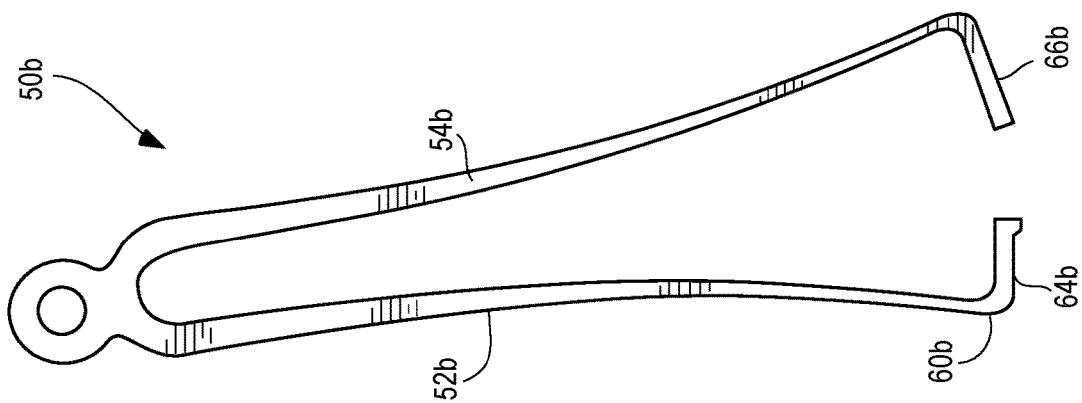
FIG. 13 is a front, side elevation view of another embodiment of a skirted leaf seal including an alternative skirt configuration.
Figure 12:
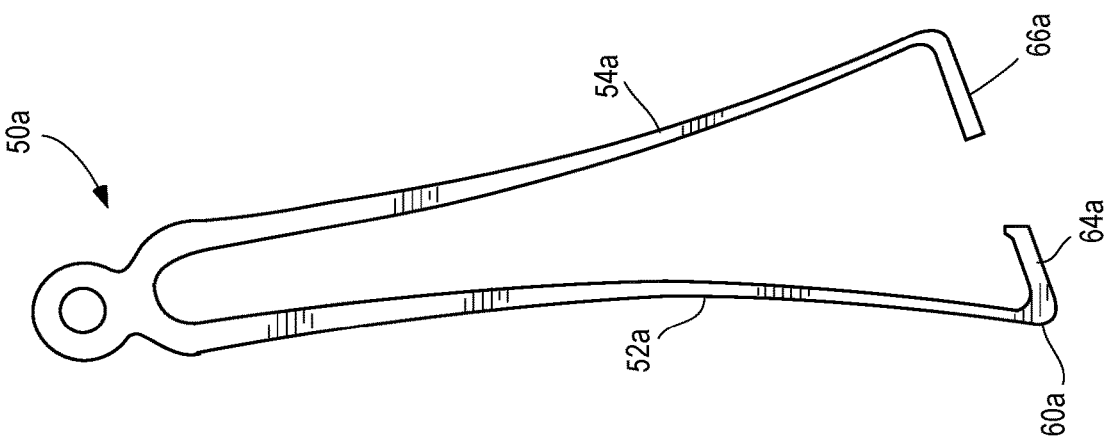
FIG. 12 is a front, side elevation view of another embodiment of a skirted leaf seal including an angled skirt.

Turning to FIGS. 12, 13, and 14, additional embodiments of the skirted leaf seal are illustrated which include alternative skirt configurations.

In FIG. 12, the skirted leaf seal 50a includes a first skirt 64a that is angled relative to the second skirt 66a. The first skirt 64a is angled away from the second skirt 66a such that the first skirt 64a does not contact the second skirt 66a except at the sealing interface as designed. The flap arm 52a is longer than the wall arm 54a, which positions the first skirt 64a below the second skirt 66a when the skirts 64a, 66a are lapped.

In FIG. 13, the skirted leaf seal 50b includes a first skirt 64b that is generally aligned with the second skirt 66b. The flap arm 52b is shorter than the wall arm 54b, which positions the first skirt 64b above the second skirt 66b when the skirts 64b, 66b are lapped. So positioned, the first skirt 64b accommodates a greater range of motion of the skirts 64b, 66b. For example, the motion of the second skirt 66a in the seal 50a is restrained when the tip of the second skirt 66a contacts the flap arm 52a because the first skirt 64a is shorter than the second skirt 66a. By contrast, the motion of the second skirt 66b does not contact the flap arm 52b when the seal 50b is compressed. Rather, the skirt 64b contacts the wall arm 54b when the seal 50b is compressed. In addition to increasing range of motion, the skirt configuration in the seal 50b changes the point of contact with the flap in a way that may be beneficial from a packaging perspective.

In FIG. 14, the skirted leaf seal 50c includes a first skirt 64c that is angled relative the second skirt 66c. The first skirt 64c is angled away from the second skirt 66c such that the first skirt 64c does not contact the second skirt 66c except at the sealing interface as designed. The flap arm 52c is shorter than the wall arm 54c which positions the first skirt 64c is positioned above the second skirt 66c.

It is contemplated that the skirted leaf seals described herein may be installed in any moveable and/or dynamic gap, for example, between any form of moveable flap and stationary structure.

Further aspects of the invention are provided by the subject matter of the following clauses:

A seal apparatus for sealing a gap between a movable flap and a stationary structure, the seal apparatus comprising: a first seal having a first proximal end portion, a first distal end portion with a first bend, and a first skirt extending away from the first bend; and a second seal having a second proximal end portion, a second distal end portion with a second bend, and a second skirt extending away from the second bend, the second seal opposite the first seal and forming an interior space therebetween, wherein the first seal biases away from the second seal to seal the gap.

The seal apparatus of any preceding clause wherein the first seal and the second seal are a single piece of material.

The seal apparatus of any preceding clause wherein the first seal and the second seal are flexurally related such that the first seal and the second seal have a predetermined movement.

The seal apparatus of any preceding clause wherein the first proximal end portion is coupled to the second proximal end portion.

The seal apparatus of any preceding clause wherein the first skirt engages the second skirt at a first surface of contact to seal the interior space.

The seal apparatus of any preceding clause wherein the first bend engages the movable flap at a second surface of contact, the second surface of contact sealing a space between the first seal and the moveable flap.

The seal apparatus of any preceding clause wherein the second bend engages the structure at a third surface of contact, the third surface of contact sealing a space between the second seal and the stationary structure.

The seal apparatus of any preceding clause wherein the first seal and the second seal are in sliding contact at the first surface of contact.

The seal apparatus of any preceding clause wherein the first seal and the second seal include a common attachment for mounting the first seal and the second seal for relative rotation, and wherein the first seal is a first elongate sheet and the second seal is a second elongate sheet.

The seal apparatus of any preceding clause wherein the first surface of contact seals the interior space between the second seal and the first seal.

A gas turbine nozzle, comprising: a stationary sidewall; a movable flap adjacent the stationary sidewall; and a seal apparatus disposed between the stationary sidewall and the moveable flap to seal a gap between the stationary sidewall and the moveable flap, the seal apparatus operably coupled to the moveable flap and comprising: a first seal having a first proximal end portion, a first distal end portion with a first bend, and a first skirt extending away from the first bend; and a second seal having a second proximal end portion, a second distal end portion with a second bend, and a second skirt extending away from the second bend, the second seal opposite the first seal and forming an interior space therebetween, wherein the first seal biases away from the second seal to seal the gap.

The gas turbine nozzle of any preceding clause wherein the seal apparatus exerts a force to urge the first seal towards the flap and to urge the second seal towards the structure to seal the gap.

The gas turbine nozzle of any preceding clause wherein the first skirt engages the second skirt at a first surface of contact to seal the interior space.

The gas turbine nozzle of any preceding clause wherein the first surface of contact seals the interior space between the second seal and the first seal.

The gas turbine nozzle of any preceding clause wherein the first seal and the second seal include a common attachment for mounting the first seal and the second seal for relative rotation, and wherein the seal apparatus is operably coupled to the moveable flap via a housing, the housing comprising a cantilever coupled to the common attachment.

The gas turbine nozzle of any preceding clause wherein the cantilever counteracts a core pressure of the gas turbine nozzle.

A method of sealing a dynamic gap using a seal apparatus, the seal apparatus comprising: a first seal having a first proximal end portion and a first distal end portion; and a second seal having a first proximal end portion and a second distal end portion, the second seal opposite the first seal and forming an interior space therebetween, wherein the first seal biases away from the second seal to seal a gap, the method comprising: contacting at least two surfaces of the gap with the first distal end portion and the second distal end portion; and moving automatically at least the second distal end portion relative to one of the at least two surfaces in response to the gap changing size.

The method of any preceding clause wherein the method seals the dynamic gap using at least two seal apparatuses.

The method of any preceding clause wherein the method further comprises the steps of providing an attachment member affixed to the first proximal end portion and the second proximal end portion and rotating the first seal and the second seal about the attachment member in response to a force applied to the seal apparatus by at least one of the at least two surfaces.

The method of any preceding clause wherein the method further comprises the steps of providing the first seal with a first skirt extending from the first distal end portion and the second seal with a second skirt extending from the second distal end portion and engaging automatically the first skirt with the second skirt at a first surface of contact between the first skirt and second skirt to seal the interior space.

It will be understood that various changes in the details, materials, and arrangements of parts and components which have been herein described and illustrated to explain the nature of the dynamic seals between moving components and stationary components may be made by those skilled in the art within the principle and scope of the appended claims. Furthermore, while various features have been described with regard to particular embodiments, it will be appreciated that features described for one embodiment also may be incorporated with the other described embodiments.

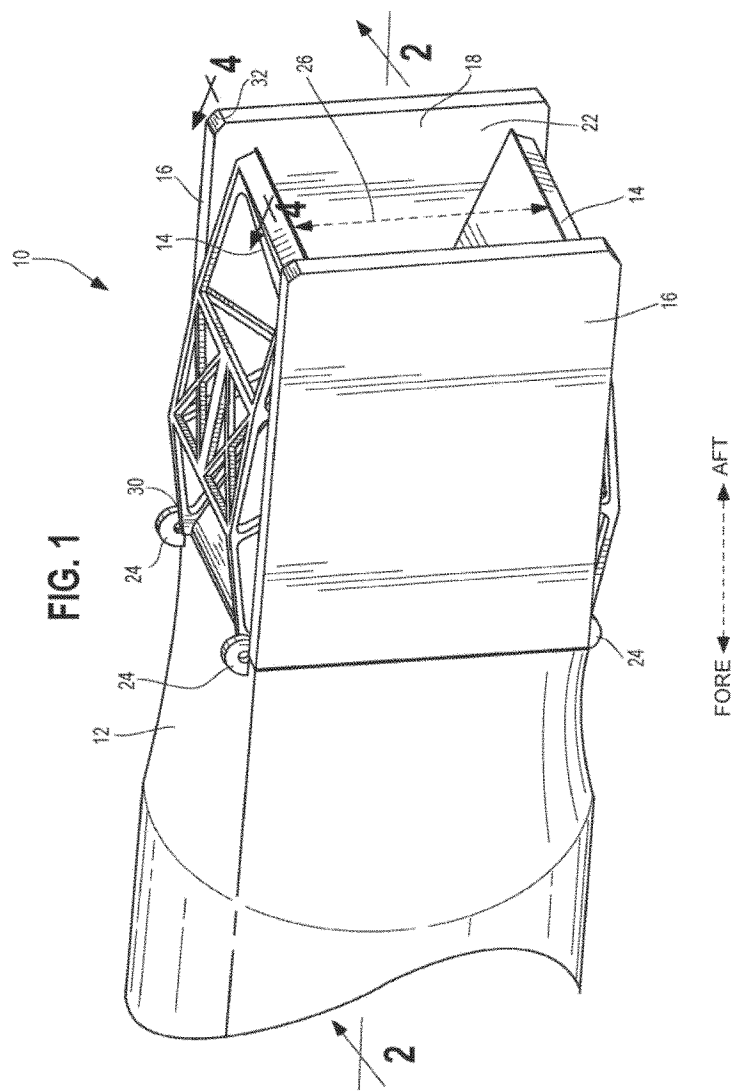

What is claimed is:

1. A seal apparatus for sealing a gap between a movable flap and a stationary structure, the seal apparatus comprising:
   a first seal having a first proximal end portion, a first distal end portion with a first bend, and a first skirt extending away from the first bend; and
   a second seal having a second proximal end portion, a second distal end portion with a second bend, and a second skirt extending away from the second bend, the second seal opposite the first seal and forming an interior space therebetween,
   wherein the first seal biases away from the second seal to seal the gap, and wherein the first skirt engages the second skirt at a first surface of contact to seal the interior space.

2. The seal apparatus of claim 1, wherein the first seal and the second seal are a single piece of material.

3. The seal apparatus of claim 1, wherein the first seal and the second seal are flexurally related such that the first seal and the second seal have a predetermined movement.

4. The seal apparatus of claim 1, wherein the first proximal end portion is coupled to the second proximal end portion at a connecting portion.

5. The seal apparatus of claim 4, wherein an attachment member rotatably attaches the connecting portion to the stationary structure such that the connecting portion is able to rotate about the attachment member.

6. The seal apparatus of claim 1, wherein the first bend engages the movable flap at a second surface of contact, the second surface of contact sealing a space between the first seal and the movable flap.

7. The seal apparatus of claim 6, wherein the second bend engages the stationary structure at a third surface of contact, the third surface of contact sealing a space between the second seal and the stationary structure.

8. The seal apparatus of claim 1, wherein the first seal and the second seal are in sliding contact at the first surface of contact.

9. The seal apparatus of claim 1, wherein the first seal and the second seal include a common attachment for mounting the first seal and the second seal for relative rotation, and wherein the first seal is a first elongate sheet and the second seal is a second elongate sheet.

10. The seal apparatus of claim 1, wherein the first surface of contact seals the interior space between the second seal and the first seal.

11. A gas turbine nozzle, comprising:
    a stationary sidewall;
    a movable flap adjacent the stationary sidewall; and
    a seal apparatus disposed between the stationary sidewall and the movable flap to seal a gap between the stationary sidewall and the movable flap, the seal apparatus operably coupled to the movable flap and comprising:
- a first seal having a first proximal end portion, a first distal end portion with a first bend, and a first skirt extending away from the first bend; and
- a second seal having a second proximal end portion, a second distal end portion with a second bend, and a second skirt extending away from the second bend, the second seal opposite the first seal and forming an interior space therebetween, wherein the first seal biases away from the second seal to seal the gap, and wherein the first skirt engages the second skirt at a first surface of contact to seal the interior space.

12. The gas turbine nozzle of claim 11, wherein the seal apparatus exerts a force to urge the first seal towards the movable flap and to urge the second seal towards the stationary sidewall to seal the gap.

13. The gas turbine nozzle of claim 11, wherein the first seal and the second seal are a single piece of material.

14. The gas turbine nozzle of claim 11, wherein the first seal and the second seal include a common attachment for mounting the first seal and the second seal for relative rotation, and wherein the seal apparatus is operably coupled to the movable flap via a housing, the housing comprising a cantilever coupled to the common attachment.

15. The gas turbine nozzle of claim 14, wherein the cantilever counteracts a core pressure of the gas turbine nozzle.

16. The gas turbine nozzle of claim 11, wherein the first proximal end portion and the second proximal end portion are coupled together at a connecting portion, and wherein an attachment member rotatably attaches the connecting portion to the stationary sidewall such that the connecting portion is able to rotate about the attachment member.

17. A method of sealing using a seal apparatus, the seal apparatus comprising: a first seal having a first proximal end portion and a first distal end portion with a first skirt extending from the first distal end portion; and a second seal having a second proximal end portion and a second distal end portion with a second skirt extending from the second distal end portion, the second seal opposite the first seal and forming an interior space therebetween, wherein the first seal biases away from the second seal to seal a gap, the method comprising:
- contacting at least two surfaces of the gap with the first distal end portion and the second distal end portion;
- moving automatically at least the second distal end portion relative to one of the at least two surfaces in response to the gap changing size; and
- engaging automatically the first skirt with the second skirt at a first surface of contact between the first skirt and second skirt to seal the interior space.

18. The method of claim 17, wherein the method seals the gap using at least two seal apparatuses.

19. The method of claim 17, further wherein the first proximal end portion and the second proximal end portion are coupled together at a connecting portion, and wherein an attachment member rotatably attaches the connecting portion to one of the at least two surfaces, and rotating the connecting portion about the attachment member in response to a force applied to the seal apparatus by at least one of the at least two surfaces.

20. The method of claim 19, wherein the attachment member is a knuckle or a hollow tube.

* * * * *

UNITED STATES PATENT AND TRADEMARK OFFICE
CERTIFICATE OF CORRECTION

PATENT NO. : 11,719,191 B2
APPLICATION NO. : 17/352605
DATED : August 8, 2023
INVENTOR(S) : James Shealy et al.

It is certified that error appears in the above-identified patent and that said Letters Patent is hereby corrected as shown below:

In the Drawings

Replace FIG. 1 with the attached Replacement Sheet of FIG. 1, which switches the "FORE" and "AFT" labels on the reference arrow at the bottom of FIG. 1.

In the Claims

In Column 18, Claim 19, Line 23, delete "further wherein the" and insert -- wherein the --, therefor.

Signed and Sealed this
Twenty-ninth Day of October, 2024

Katherine Kelly Vidal
Director of the United States Patent and Trademark Office